July 11, 1967    R. C. VINCENT    3,330,516
CABLE CLAMP
Filed Oct. 1, 1965
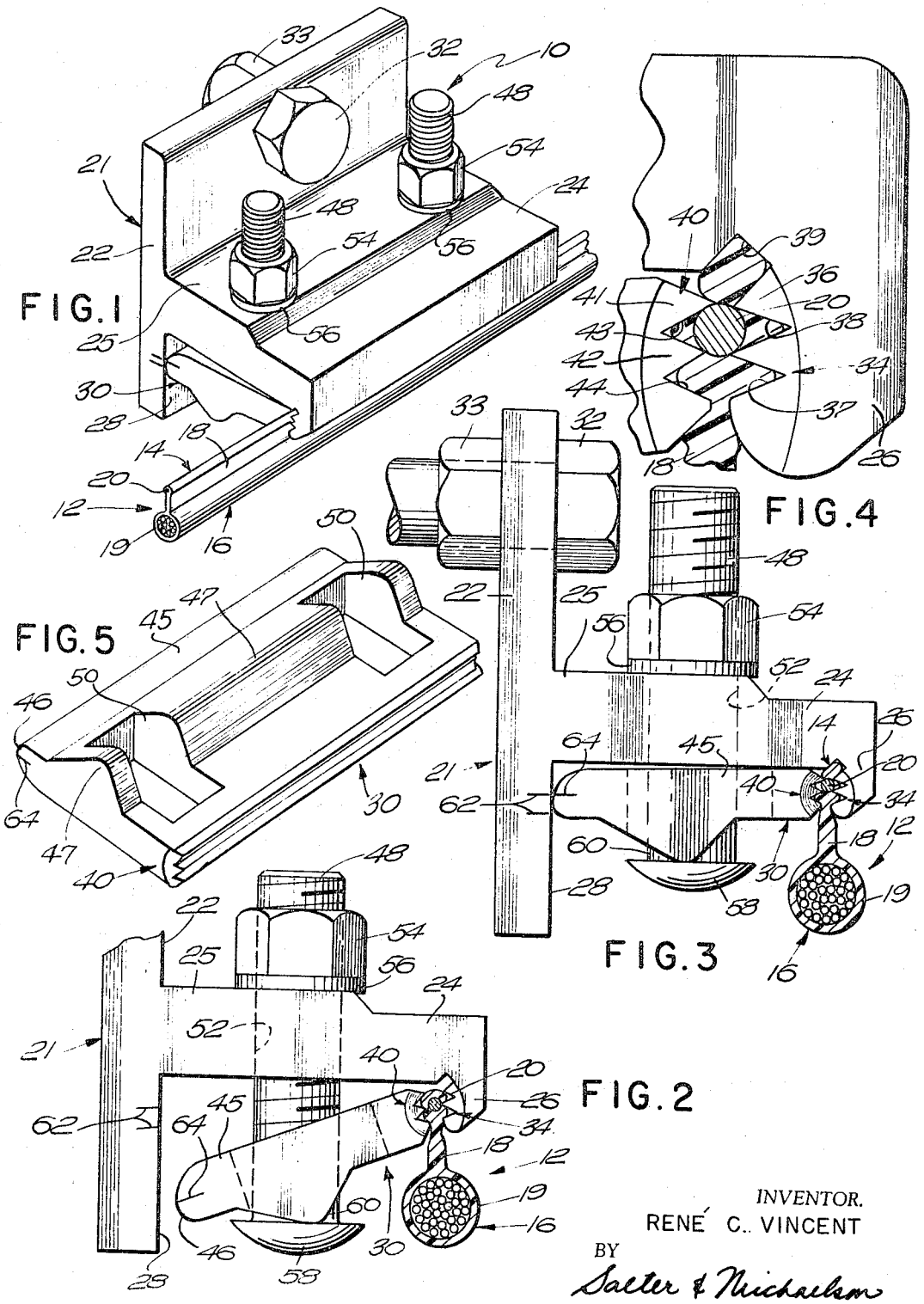
INVENTOR.
RENÉ C. VINCENT
BY
Salter & Michaelson
ATTORNEYS United States Patent Office 3,330,516
Patented July 11, 1967

3,330,516
CABLE CLAMP
René C. Vincent, Lincoln, R.I., assignor to Ansonia Wire & Cable Co., Ashton, R.I., a corporation of Rhode Island
Filed Oct. 1, 1965, Ser. No. 492,163
9 Claims. (Cl. 248—61)

The present invention relates to a cable clamp for aerial telephone cable. More particularly, the present invention relates to a clamp for mounting aerial telephone cable of the figure-eight type on a telephone pole.

The present invention has particular application in the mounting of telephone cable of the figure-eight type in an elevated position on telephone poles. Prior to the instant invention, various forms of cable clamps have been employed for the aerial mounting of telephone cable, but all of these prior known devices have employed a clamping action through the use of bolts for securing the cable in place. Thus, in the prior telephone cables, it was through the direct force of the bolt that the cable clamping members were secured in place. The present invention defines a departure over the prior known constructions and utilizes a clamping plate that cooperates with a bracket for exerting a force on the support member of the figure-eight cable that retains the cable in a clamped position. Thus, in the present invention it is the clamping plate that defines the means for clamping the cable in a fixed position.

In order to accomplish the purpose of mounting the figure-eight cable in clamped position, the bracket that forms a part of the cable clamp herein has a T configuration and includes a base to which a horizontal leg is joined, the leg having a flange formed thereon. A clamping plate is adapted to be received between the flange of the leg and the base thereof, the plate being secured to the leg by bolt means. The clamping plate is provided with a uniquely formed jaw at the clamping end thereof, and in the secured position thereof exerts a force on a support member of the cable that is locked between the clamping end of the plate and the flange portion of the leg in which a complementary jaw is formed. The cable is thus securely clamped to the bracket by means of the clamping plate, the jaw of which exerts a force sufficient to cause the teeth on the plate jaw to penetrate the jacket portion around the cable support member. The teeth that are formed on the flange and plate jaws thus seat firmly against the steel rod of the support member to securely hold the support member on the clamp. As will be described, since the cable clamp embodied herein provides for a secure clamping of the telephone cable thereto, twisting of the cable between spans or poles can be accomplished, thereby insuring a permanent grip on the cable. Proper twisting of the cable is thus provided, so as to compensate for windloads and dancing that have heretofore caused breakdowns of the prior known cables.

Accordingly, it is an object of the present invention to provide a clamp for mounting aerial telephone cable on telephone poles.

Another object of the invention is to provide a clamp for mounting aerial telephone cable of the figure-eight type on a telephone pole, wherein a clamping plate is provided for positively gripping the support member of the cable.

Still another object is to provide a clamping plate for a cable clamp that has a jaw formed thereon, the teeth of which penetrate the jacket of the cable for effectively securing the cable to the clamp.

Still another object is to provide a clamp for telephone cable that includes a clamping plate for locking a support member of the cable to the clamp, the clamping plate being movable such that a component of force resulting from the movement thereof forces an end of the plate into clamping engagement with said support members.

Other objects, features and advantages of the invention will become apparent as the description thereof proceeds when considered in connection with the accompanying illustrative drawings.

In the drawings which illustrate the best mode presently contemplated for carrying out the present invention:

FIG. 1 is a perspective view of the cable clamp embodied in the present invention showing the position thereof as mounted on a telephone pole and with a cable clamped thereto;

FIG. 2 is an end elevational view of the cable clamp illustrating the position of the clamping plate prior to movement to the clamping position thereof;

FIG. 3 is an end view similar to FIG. 2 showing the position of the clamping plate after movement to the clamping position thereof;

FIG. 4 is an enlarged fragmentary view of the clamping jaws formed on the bracket flange and clamping plate as they are clamped around the support member of an aerial cable; and FIG. 5 is a perspective view of the clamping plate.

Referring now to the drawing and particularly to FIG. 1, the cable clamp of the present invention is generally indicated at 10 and, as shown, may be mounted on a conventional telephone pole in an elevated position thereon. Although the cable clamp 10 has particular application in the clamping of an aerial telephone cable of the figure-eight type on a pole, it is understood that the concept of the invention embodied in the cable clamp 10 may be employed for the clamping of different forms of telephone cable in aerial position on telephone poles without departing from the spirit of the invention.

As illustrated in the drawing, a telephone cable generally indicated at 12 includes a support member 14 that is joined to a conductor portion or core 16 through a web 18. The support member 14 and core 16 have a polyethylene jacket 19 extruded thereon, the extruded polyethylene jacket 19 also forming the web 18 that interconnects the support member and core. As is well known in the art, the support member 14 of the cable 12 is provided for the mounting of the cable in aerial position and includes a steel wire 20 that extends therethrough for carrying the load of the cable in the mounted position thereof. In this connection, the steel wire 20 of the support member 14 is not employed for conducting purposes but may be used as a ground if it is so desired. Thus, as will be described hereinafter, the cable clamp 10 is adapted to clamp the support member 14 of the cable thereto, the cable clamp 10 thus mounting the conductor core 16 in aerial position in the required manner.

As shown in the drawing, the cable clamp 10 includes a one-piece bracket generally indicated at 21 that may be extruded of aluminum or machined of any suitable metal material. The bracket 21 is formed with a generally T configuration and includes a base 22 that in the position of use, as illustrated in FIG. 1, is located in a generally vertical position. Joined to the base 22 intermediate the ends thereof is a leg 24 to which a downwardly projecting flange 26 is joined. The leg 24 is formed with a thickened portion 25 which, as will be described, prevents deflection of the leg when the cable 12 is clamped in position on the clamp 10. The flange 26 is disposed generally perpendicular to the leg 24 and generally parallel to the base 22. The portion of the base 22 that is disposed opposite to the flange 26 defines a shoulder 28 that cooperates with the inner surface of the flange 26 to receive a locking plate generally indicated at 30 therebetween, as will hereinafter be described. As further shown in FIG. 1, the bracket 21 is adapted to be mounted in position on a pole by means of a bolt 32 that extends through a suitable opening formed in the base 22. A nut 33 is mounted on the bolt 32 on the inside of the base 22 and is adapted to space the clamp 10 from the surface of the pole on which the clamp is mounted. It is understood that the clamp 10 may be located on a pole in any desired position, depending upon the required installation.

As seen in FIGS. 2, 3 and 4, the underside of the flange 26 is formed with a jaw generally indicated at 34 that is defined by teeth 35 and 36 between which V-shaped grooves 37 and 38 are formed. In addition, a cavity 39 is formed in the corner of the flange 26 and is adapted to receive a portion of the jacket 19 therein during the clamping operation, as will be described. In order to positively clamp the support member 14 in the jaw 34 for locating the cable 12 in the clamped position, a clamping jaw generally indicated at 40 is formed on an end of the clamping plate 30 and includes teeth 41 and 42 that define V-shaped grooves 43 and 44 therebetween. The clamping plate 30 is further defined by a body portion 45 in the outer end of which the jaw 40 is formed, the opposite end of the body portion 45 being rounded as indicated at 46. As contrasted with the prior known cable clamps, the clamping plate 30 of the clamp embodied herein is adapted to exert the force required to hold the cable 12 in position on a pole. The plate 30 is thus movable from the position illustrated in FIG. 2 to the position illustrated in FIG. 3. In order to facilitate the movement as illustrated and described, the innermost end of the body portion 45, or that end opposite the notch 40, is rounded as indicated at 46 and is adapted to engage the shoulder 28 of the base 22. The rounded configuration 46 of the clamping plate 30 thereby promotes sliding movement of the clamping plate on the shoulder 28 as it is moved into clamping position. As further seen in FIG. 5, the body portion 45 of the plate 30 is formed with a boss 47 which, as will be described, is adapted to be engaged by securing bolts and acts as means to prevent the shank of the bolts from deflecting during the tightening thereof.

The clamping plate 30 is fixed in the clamped position thereof by bolts 48 which project through slots 50 formed in the body portion 37 and boss 47 thereof. The slots 50 are located in aligned relation with respect to spaced holes 52 that are formed in the thickened portion 25 of the leg 24. Securing nuts 54 are adapted to threadably engage the bolts 48 and cooperate with lock washers 56 to lock the bolts 48 in position for securing the clamping plate 30 to the bracket 21. Each of the bolts 48 is formed with a head 58 and a shank, a portion of which is threaded and a portion of which has a square configuration as indicated at 60. The square portions 60 of the bolts are received in the slots 50 and prevent rotation of the bolts 48 when the nuts 54 are tightened on the threaded shank portions thereof.

The cable clamp 10 as described herein has universal application in mounting various size aerial cable on a pole. In this connection, the support member 12 may vary in size and still be accommodated between the jaws 34 and 40. Since the support members do vary in size, a convenient indicating means is provided for positively locating the plate 30 in the proper position for each support member. As shown in FIGS. 2 and 3, the base 22 is provided with indicator markings 62 adjacent to the shoulder 28 for indicating the position of the plate 30 for two different-size support members. An indicator marking 64 is located on the plate 30 adjacent to the rounded end 46, and is adapted to be aligned with one of the markings 62, depending upon the support member that is to be clamped between the jaws 34 and 40.

When it is required to clamp the cable 12 on a pole, the bracket 21 is mounted in position on the pole by inserting the bolt 32 through the hole in the base 22 of the bracket and into the pole. The support member 12 of the cable 14 is then positioned between the jaws 34 and 40 of the flange 26 and the mounting plate 30, the rounded end 38 of the clamping plate 30 in this position engaging the shoulder 28 of the base 22. The length of the slots 50 through which the bolts 48 extend are sufficient to compensate for the inclined position of the clamping plate 30 in the initial location thereof as seen in FIG. 2 and prior to the movement thereof to the final clamping position. As the nuts 54 are tightened on the bolts 48, the clamping plate 30 is drawn toward the leg 24 of the bracket 21. It is seen that as the plate 30 is forced toward the leg 24, the component of force resulting from the force exerted by the bolts 48 wedges the clamping plate 30 between the flange 26 and the shoulder 28. As the plate 30 approaches parallel relation with respect to the leg 24, the teeth 35 and 36 of the jaw 34 and the teeth 41 and 42 of the jaw 40 bite into the plastic jacket 19 and penetrate therein. As seen in FIG. 4, this penetrating action causes the support wire 20 to be received within the grooves 38 and 43 and in tangential relation with respect to the adjacent teeth 35, 36 and 41, 42. In this connection, it is seen that the configuration of the teeth that define the jaws will determine the diameter of the wire 20.

Since the clamping of the jaws 34 and 40 against the support member 14 produces a squeezing action thereon, the plastic jacket 19 surrounding the wire 20 is deformed, the deformation, as shown in FIG. 4, causing the jacket 19 to flow into the cavity 39 and grooves 37, 38, 43 and 44. The plate 30 thus effectively clamps the support member to the clamp 10.

During the tightening of the plate 30 and as it is moved from the position shown in FIG. 2 to the position shown in FIG. 3, the leg 24 is subjected to considerable pressure by the bolt 48. In order to prevent deflection of the leg 24, the thickness thereof is increased adjacent to the bolt hole 52 as indicated at 25, this increase in leg thickness providing for optimum strength in this area when a maximum force is applied by the bolts 48. Similarly, the plate 30 is also increased in thickness in the area of the openings 52 as indicated by the boss 47, the bolt heads 58 making contact with the boss 47 which acts as a cam thereagainst. The camming action as produced by the boss 47 against the underside of the bolt heads 58 cooperates with the plate 30 to prevent deflection of the bolt shank as the force on the plate is increased.

With the cable 12 clamped to the cable clamp 10 in the manner as described, wherein the support member 14 is secured between the flange 26 and clamping plate 30, the support member is positively prevented from turning, thereby preventing spiralling or undue loading of the cable at the pole. With the use of the present invention, it is also possible to twist the cable between spans in the manner as now employed in normal construction practice. Since the support member is prevented from twisting in the clamped area, the proper twist can be imparted in the cable between poles as required.

The use of the indicator markings 62 and 64 further aids in obtaining the required locking on the cable by the clamping plate 30. Thus, in lieu of a torque wrench that is normally employed in tightening bolts where tightening specifications are used, the required force on the cable can be obtained by merely aligning the proper indicator markings.

While there is shown and described herein certain specific structure embodying the invention, it will be manifest to those skilled in the art that various modifications and rearrangements of the parts may be made without departing from the spirit and scope of the underlying inventive concept, and that the same is not limited to the particular form herein shown and described, except insofar as indicated by the scope of the appended claims.

What is claimed is:

1. In a cable clamp for mounting aerial telephone cable on a pole, a bracket including a base to which a leg is joined in perpendicular relation with respect thereto, a flange joined to said leg and being located in spaced parallel relation with respect to said base, means extending through said base for securing said clamp to said pole, and a clamping plate mounted on said bracket between said flange and base and movable to a clamping position therebetween for clamping said cable between an end thereof and said flange, and means for moving said plate toward a parallel position with respect to said leg, wherein a component of force resulting from movement of said plate forces the end of said clamp into clamping engagement with said cable.

2. In a cable clamp as set forth in claim 1, said cable including a conductor portion and a support member joined to said conductor portion through a web, the inner surface of said flange defining a jaw, the end of said plate that engages said cable having a jaw formed thereon, said jaws receiving the support member of said cable therebetween in clamping engagement.

3. In a cable clamp as set forth in claim 2, each of said jaws including a plurality of teeth between which grooves are defined, said support member of said cable including a rod around which a jacket is formed, said teeth penetrating said jacket when said jaws are located in the clamping position thereof.

4. In a cable clamp as set forth in claim 3, said jaw that is formed in said flange further including a cavity, the clamping action of said jaws causing said jacket to squeeze into the grooves defined by said teeth and into said cavity.

5. In a cable clamp as set forth in claim 4, said teeth being preformed to define the grooves therebetween such that penetration of said jacket by said teeth will cause said teeth to receive said rod therebetween in tangential relation with respect thereto.

6. In a cable clamp as set forth in claim 2, said base having indicator markings formed thereon that define reference markings for different size cables that may be secured to said clamp, the end of said plate that is located adjacent to said base having an indicator marking formed thereon that is adapted to be aligned with one of said reference markings on said base and in accordance with the size of the cable that is secured to said clamp, wherein said plate is located in proper position for effectively clamping of said cable to said clamp.

7. In a cable clamp as set forth in claim 1, said moving means including bolts that extend through said plate for securement in said leg, said bolts exerting a force on said plate that is perpendicular to said leg, the component of force directed toward said flange being a function of the force exerted by said bolts, wherein the greater the force exerted by said bolts on said plate, the greater the resultant force exerted on said cable by the end of said plate.

8. In a cable clamp as set forth in claim 7, said plate having a boss formed thereon through which holes extend for receiving said bolts, said boss engaging the underside of the heads of said bolts and effecting a camming action thereon to prevent deflection of the bolt shanks as the bolts are tightened.

9. In a cable clamp as set forth in claim 7, said leg having a thickened portion through which the shanks of said bolts extend, said thickened portion preventing deflection of the leg as said plate is moved toward the clamping position thereof.

References Cited

UNITED STATES PATENTS

| | | | |
|---|---|---|---|
| 3,141,643 | 7/1964 | Shrewsbury | 248—61 X |
| 3,154,279 | 10/1964 | Fletcher et al. | 248—61 X |
| 3,160,378 | 12/1964 | Goewey | 248—61 |

ROY D. FRAZIER, *Primary Examiner.*

J. F. FOSS, *Assistant Examiner.*